United States Patent
Briggs et al.

(10) Patent No.: US 7,065,697 B2
(45) Date of Patent: *Jun. 20, 2006

(54) SYSTEMS AND METHODS OF PARTITIONING DATA TO FACILITATE ERROR CORRECTION

(75) Inventors: Theodore Carter Briggs, Plano, TX (US); Jay Tsao, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 371 days.

This patent is subject to a terminal disclaimer.

(21) Appl. No.: 10/632,207

(22) Filed: Jul. 29, 2003

(65) Prior Publication Data

US 2005/0028057 A1    Feb. 3, 2005

(51) Int. Cl.
*G11C 29/00*    (2006.01)

(52) U.S. Cl. .................... 714/767; 714/773
(58) Field of Classification Search ............... 714/767, 714/772, 773
See application file for complete search history.

(56) References Cited

U.S. PATENT DOCUMENTS

| | | | |
|---|---|---|---|
| 4,485,471 A | 11/1984 | Singh et al. | |
| 5,878,059 A * | 3/1999 | Maclellan | 714/768 |
| 6,024,486 A * | 2/2000 | Olarig et al. | 714/763 |
| 6,141,789 A * | 10/2000 | Cypher | 714/805 |
| 6,233,716 B1 * | 5/2001 | Cypher | 714/805 |
| 6,301,680 B1 * | 10/2001 | Cypher | 714/746 |
| 6,304,992 B1 | 10/2001 | Cypher | |
| 6,370,668 B1 * | 4/2002 | Garrett et al. | 714/763 |
| 6,453,440 B1 | 9/2002 | Cypher | |
| 6,463,506 B1 | 10/2002 | McAllister et al. | |
| 6,473,880 B1 * | 10/2002 | Cypher | 714/800 |
| 6,477,682 B1 | 11/2002 | Cypher | |
| 6,493,843 B1 * | 12/2002 | Raynham | 714/763 |
| 6,519,717 B1 | 2/2003 | Williams et al. | |
| 6,574,768 B1 | 6/2003 | Cypher | |
| 6,584,595 B1 | 6/2003 | Cypher | |
| 2002/0199150 A1 * | 12/2002 | Holman | 714/755 |
| 2003/0070133 A1 * | 4/2003 | Bauman et al. | 714/763 |
| 2003/0140300 A1 * | 7/2003 | Chen et al. | 714/763 |

OTHER PUBLICATIONS

Affidavit of Richard W. Adkisson, Feb. 17, 2005, 4 pages.
Timothy J. Dell, "A White Paper On The Benefits of Chipkill-Correct ECC for PC Server Main Memory", IBM Microelectronics Division, Nov. 19, 1997, pp. 1-23.

* cited by examiner

Primary Examiner—Stephen M. Baker

(57) ABSTRACT

Systems and methods are provided for detecting and correcting bit errors in data structures. A data block and/or data structure is partitioned into adjacent bit pair domains, such that a single adjacent bit pair from each memory device is assigned to a given adjacent bit pair domain. The bits in the adjacent bit pair domain are processed by an error correction unit sequentially or in parallel, and then recombined to be written into memory or transmitted to a requestor.

24 Claims, 7 Drawing Sheets

SYSTEMS AND METHODS OF PARTITIONING DATA TO FACILITATE ERROR CORRECTION

CROSS REFERENCE TO RELATED APPLICATIONS

The present application is related to Tsao, et al. U.S. Patent Application entitled "Systems and Methods of Routing Data to Facilitate Error Correction", Filed Jul. 29, 2003, Application No. 10/632,206, which is assigned to the same assignee as the present application and which is incorporated herein by reference.

TECHNICAL FIELD

The present invention relates to error correction and, more particularly, to the partitioning of data to facilitate error correction.

BACKGROUND OF INVENTION

Error control codes are commonly used in electronic systems to detect and/or correct data errors, such as transmission errors or storage errors. One common use of error control codes is to detect and correct errors with data stored in a memory of computer system. For example, error correction bits, also called check bits, can be generated for data prior to storing data to one or more memory devices. The check bits are appended to the data to provide a data structure that is stored in memory. When the data is read from the one or more memory devices, the check bits can be used to detect or correct errors within the data. Errors can be introduced, for example, either due to faulty components or noise in the computer system. Faulty components can include faulty memory devices or faulty data paths between the devices within the computer system, such as faulty pins.

Error management techniques have been developed to mitigate the effects associated with these errors. One simple technique used for personal computers is known as parity checking. Parity checking utilizes a single bit associated with a piece of data to determine whether there is a single bit error in the data. Parity checking cannot detect multiple bit errors and provides no means for correcting errors. A more sophisticated system, such as a server, uses error correction codes (ECCs) to detect and correct some errors. A typical ECC system may use eight ECC bits (check bits, correction bits) for a 64-bit piece of data. The ECC bits provide enough information for an ECC algorithm to detect and correct a single bit error, or to detect double bit errors.

One error correction feature employed by servers is referred to in the industry as chipkill. The term chipkill refers to the ability to correct multiple bit errors in memory, where multiple bit errors are confined within the width of the memory device. For example, for a 32Mbit dynamic random access memory (DRAM) device that is 4 bits wide, a system that supports a chipkill function would be able to correct a 4-bit wide error in the memory device. Thus, the failure of an entire 4-bit wide DRAM chip during a DRAM cycle (e.g., read operation, write operation) in a configuration that supports chipkill would not cause the system to fail. Chipkill allows a system to operate in the event of multiple bit errors in any one memory device.

SUMMARY OF INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some general concepts of the invention in a simplified form as a prelude to the more detailed description that is presented later.

The present invention relates to systems and methods for detecting and correcting errors in data structures. The systems and methods employ error correction code (ECC) techniques that detect and correct errors in a data structure. The data structure is partitioned into domains referred to herein as 'adjacent bit pair domains,' with each adjacent bit pair domain being assigned an adjacent bit pair from each memory device. Data associated with a given adjacent bit pair domain can include data bits and check bits that are employed by an ECC technique to detect and correct data bit errors (e.g., single bit errors, adjacent double bit errors) associated with the adjacent bit pair domain.

In one aspect of the invention, systems and methods are provided for detecting and correcting errors in a data structure, for example, during a read or write operation of a system memory. The data structure is stored in a plurality of memory devices associated with a memory address. A data separator partitions the data structure into adjacent bit pair domains, such that a single adjacent bit pair from each of the plurality of memory devices is assigned to an adjacent bit pair domain. An error detection and correction (EDC) component detects and corrects errors associated with a given adjacent bit pair domain.

DETAILED DESCRIPTION

The present invention relates generally to systems and methods for detecting and correcting bit errors in data structures. The systems and methods employ error correction code (ECC) techniques that detect and correct single bit errors and adjacent bit pair errors in a data structure. The systems and methods are operative to process data structures having more bits than can be detected and corrected by a single application of the ECC techniues employed. This is accomplished by partitioning the data structure (data block) into domains having a number of bits equal to the number of bits that can be processed by a single application the ECC techniques employed. Chipkill is facilitated by populating the separate domains with adjacent bit pairs, such a single adjacent bit pair from each memory device is assigned to a given adjacent bit pair domain.

The data bits in the separate adjacent bit pair domains are processed by one or more error correction units sequentially or in parallel and then recombined to be written into memory or transmitted to a requester (e.g., via a crossbar device). As used herein, a data block is defined as data that is transmitted or received from a crossbar device, while a data structure is the data and check bits or correction bits associated with the data block that are stored in memory corresponding to a given memory address. The terms data block and data structure are utilized for clarity and not meant to define any specific limiting data format.

Figure 1:
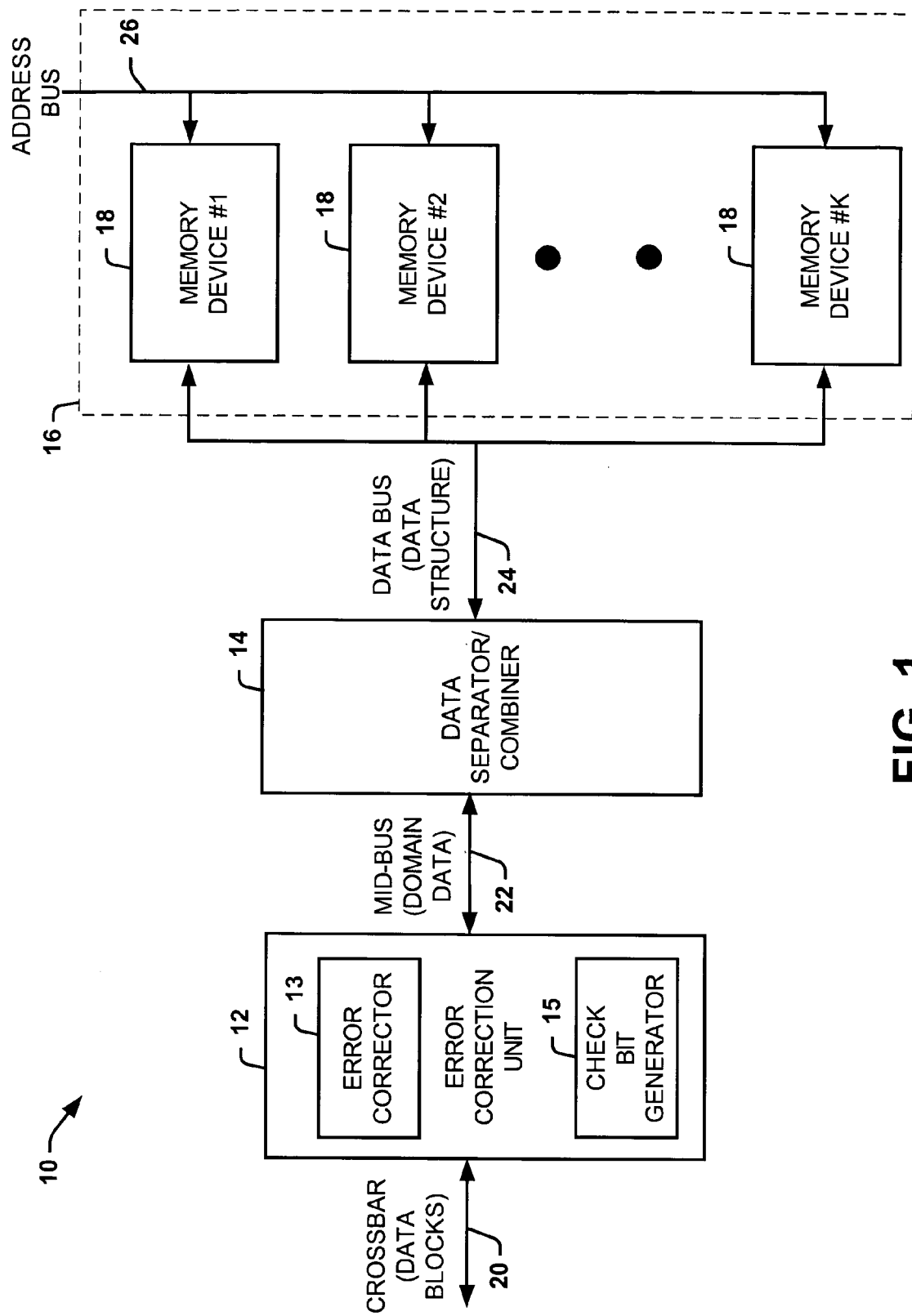
FIG. 1 illustrates a block diagram of a system for detecting and correcting bit errors in a data structure in accordance with an embodiment of the present invention.

FIG. 1 illustrates a system 10 for detecting and correcting errors in a data structure in accordance with an aspect of the present invention. The system 10 can be a server or other computer system that performs error correction associated with a system memory. The system 10 includes an error correction unit 12, a data separator/combiner 14 and a system memory 16. The system memory 16 is comprised of a plurality of memory devices 18, labeled memory device #1 through #K, where #K is an integer greater than one. The memory devices 18 can be, for example but not limited to, single-in-line memory modules (SIMM), dual-in-line memory modules (DIMM) and dynamic random access memory (DRAM) modules or other types of memory devices. The system memory 16 is coupled to a data bus 24 and an address bus 26. The size of the data bus 24 and the data structure stored and read into memory in a single memory cycle is equal to the number of memory devices multiplied by the bit column width of the memory devices.

For example, if the system memory is comprised of 72 memory devices having 4-bit column width, then the size of the data bus 24 and data structure stored and read in a single memory cycle would be 288 bits. However, an ECC checker and corrector for a 288-bit ECC codeword is considered impractical. Therefore, the present invention partitions the data structure into separate adjacent bit pair domains comprised of adjacent bit pairs from each memory device, such that a single adjacent bit pair from each of the memory devices is assigned to a given domain. Error detection and correction can then be performed on data bits associated with the separate adjacent bit pair domains sequentially in less time than otherwise required, or in parallel.

The error correction unit 12 is coupled to a crossbar device (not shown), for example, over a crossbar bus 20. The crossbar device can be coupled to a plurality of microprocessor devices, input/output devices and/or memory devices (e.g., one or more cache memory devices). The crossbar device is a switching/ routing system that allows for communications between a plurality of different devices. The error correction unit 12 can be part of a memory controller or cache coherency controller. The functionality of the error correction unit 12 can be comprised of hardware, software or a combination of hardware and software. It is to be appreciated that the error correction unit 12 can be formed of at least a portion of an application specific integrated circuit or very large scale integrated (VLSI) circuit.

The error correction unit 12 includes an error corrector 13 and a check bit generator 15. The error correction unit 12 is operative to receive data blocks from the crossbar device, partition the data blocks into a plurality of adjacent bit pair domain data sets, and generate check bits for each of the plurality of adjacent bit pair domains. The check bits for the data block are then added to the adjacent bit pair domains. The adjacent bit pair domains are assigned to adjacent data bit pairs for each memory device. The number of adjacent bit pair domains is based on the column width of the system memory 16. For example, two adjacent bit pair domains are employed for memory devices with a 4-bit column width, while four adjacent bit pair domains would be employed for memory devices with an 8-bit column width.

The adjacent bit pair domains are transmitted over a mid-bus 22 to the data separator/combiner device 14 (e.g., buffer/multiplexer device). The data separator/combiner 14 can be a single integrated device or a plurality of devices that perform the functionality associated with the data separator/combiner 14. The adjacent bit pair domains are transmitted in a sequential order and buffered by the data separator/combiner 14. Once all of the data associated with the adjacent bit pair domains are received by the data separator/combiner 14, the adjacent bit pair domain data is combined into a complete data structure and transmitted over a data bus 24 to be stored in the system memory 16 based on the selected address of the address bus 26.

For example, during a read operation, a data structure associated with an address is read from the plurality of memory devices 18 and provided to the data separator/combiner 14 via the data bus 24. For example, if each memory device has a 4-bit column width, 4 bits from each memory device are provided to the data separator/combiner 14. If each memory device has an 8-bit column width, 8 bits from each memory device 18 are provided to the data separator/combiner 14. The data separator/combiner 14 partitions the data structure into adjacent bit pair domains. Each adjacent bit pair domain includes a data portion and a correction bit portion. The number of bits in an adjacent bit pair domain corresponds to the number of bits correctable within a desired amount of time by the error corrector 13 in the error correction unit 12. Each adjacent bit pair domain includes a data portion and a correction bit portion. The number of bits in an adjacent bit pair domain corresponds to the number of bits correctable by the error corrector 13 in the error correction unit 12.

Each adjacent bit pair domain is assigned adjacent bit pairs associated with the plurality of memory devices corresponding to a given address, such that a single adjacent bit pair from each memory device is assigned to a given adjacent bit pair domain, and no more than one adjacent bit pair from a single memory device is assigned to a given domain. The data bits associated with a first adjacent bit pair domain are multiplexed via the data separator/combiner 14 and transmitted over the mid-bus 22 to be processed by the error corrector 13. It is to be appreciated that the data bits associated with a given domain can be further partitioned and transmitted sequentially over the mid-bus 22 and recombined at the error correction unit 12 prior to error correction by the error corrector 13.

While the data bits from the first adjacent bit pair domain are being processed by the error corrector 13, the data bits or portions of the data bits from the second adjacent bit pair domain are transmitted over the mid-bus 22 to the error corrector 13, such that a pipeline process is established. Subsequent data bits from additional domains, if applicable, are transmitted over the mid-bus 22 and processed by the error corrector 13, until all of the data bits associated with the data structure have been processed by the error corrector 13. Once all of the data bits have been checked and corrected for single bit errors and adjacent double bit errors, the check bits are discarded, the data associated with the adjacent bit pair domains are reorganized into a data block and transmitted to the crossbar device and routed to the initial requestor (e.g., a processor, I/O device).

It is to be appreciated that the error correction unit 12 can include additional correctors, such that correction can be performed in parallel on data bits associated with different domains to facilitate faster error correction. Additionally, the error correction unit 12 can include additional ECC codeword check bit generators, such that check bits can be assigned and appended to data bits associated with different domains to facilitate faster check bit generation.

Figure 2:
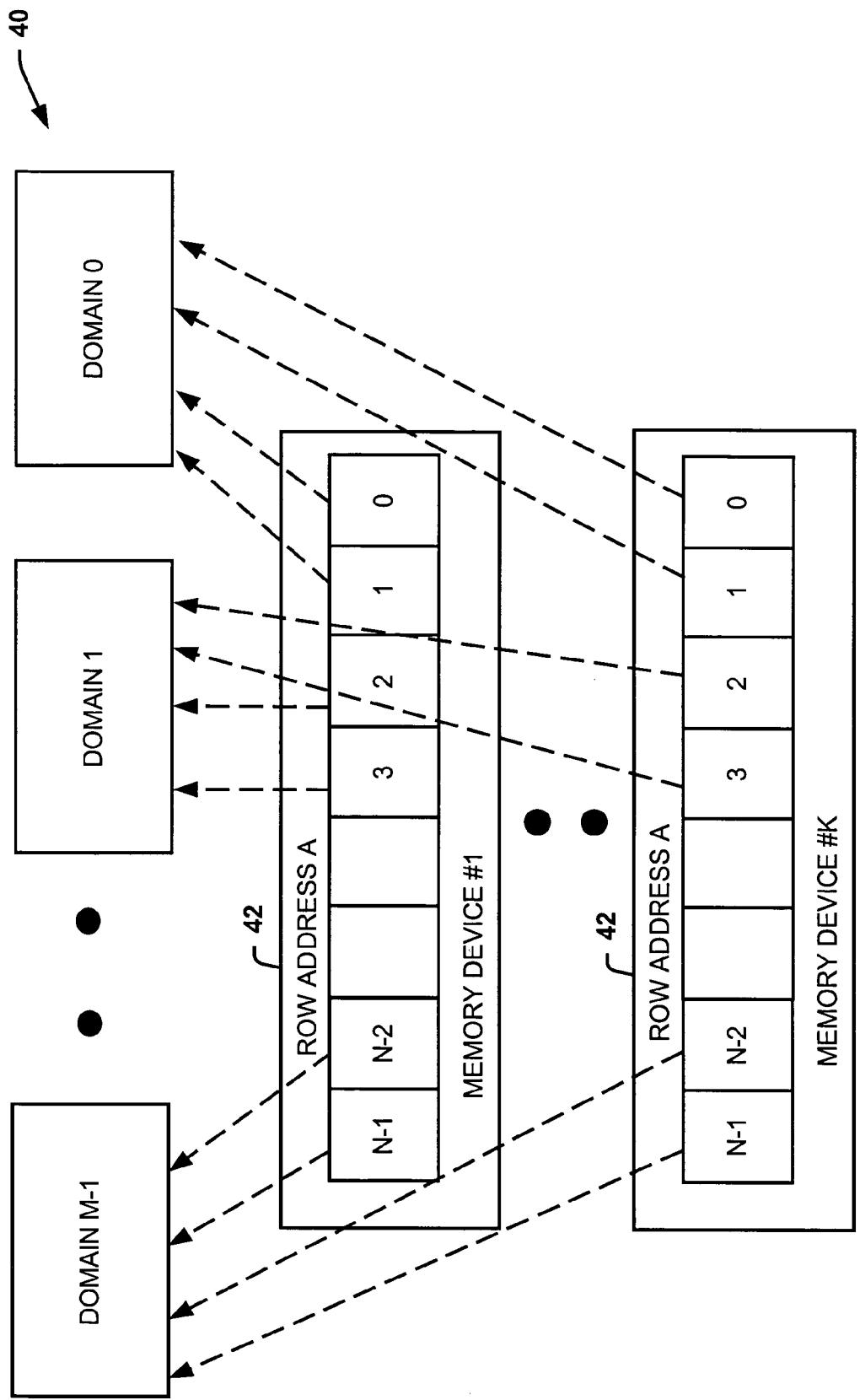
FIG. 2 illustrates a block diagram of an adjacent bit pair domain configuration in accordance with another embodiment of the present invention.

FIG. 2 illustrates an adjacent bit pair domain configuration 40 in accordance with an aspect of the present invention. The adjacent bit pair domain configuration 40 facilitates chipkill functionality to system memory devices (e.g., for servers) associated with ECC techniques that can correct single and adjacent double bit errors with memory data buses larger than the capabilities of ECC techniques. The domain configuration illustrates a plurality of memory devices 42, labeled memory device #1 through #K, where #K is an integer greater than one. Each of the memory devices 42 has a row associated with a given row address illustrated in FIG. 2 as row address A. During reading and writing of row address A, data bits associated with the row corresponding to row A are concurrently provided at the system memory data bus. Each row of the memory devices 42 has a column width N, where N is an integer multiple of 4 (e.g., 4, 8, 16, 32, etc.)

A first adjacent bit pair from each memory device 42, labeled bit #1 and bit #0, is assigned to adjacent bit pair domain 0. A second adjacent bit pair from each memory device 42, labeled bit #3 and bit #2, is assigned to adjacent bit pair domain 1. Subsequent adjacent bit pairs from each memory device 42 are assigned to subsequent adjacent bit pair domains, while the last set of bits labeled #N−1 and #N−2 from each memory device 42 are assigned to adjacent bit pair domain M−1, where M is equal to N/2. FIG. 2 illustrates the interleaving of adjacent bit pairs to corresponding adjacent bit pair domains, such that one adjacent bit pair from each memory device is assigned to a given domain during a memory read or write cycle. The above adjacent bit pair domain configuration can be scaled up or down depending on the number of bits in the adjacent bit pair domains, the bit column width of the memory devices in the system memory, and the number of bits that can be processed by the error correction technique being employed.

Figure 3:
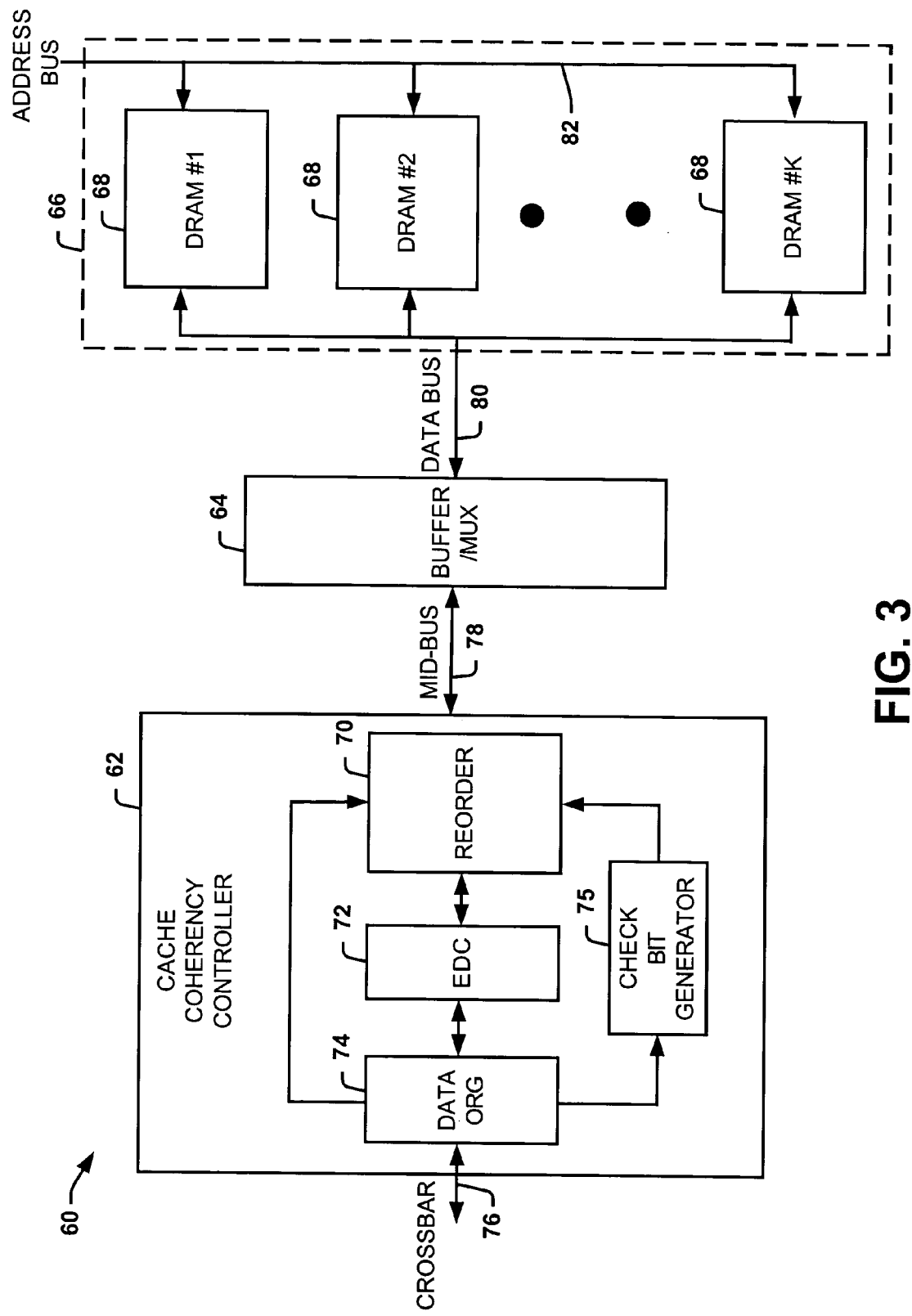
FIG. 3 illustrates a block diagram of one particular implementation of a system for detecting and correcting bit errors associated with a data structure in accordance with an embodiment of the present invention.

FIG. 3 illustrates one particular implementation of a system 60 for detecting and correcting data errors in accordance with an aspect of the present invention. The system 60 includes a cache coherency controller 62, a buffer/multiplexer 64 and a system memory 66. The cache coherency controller 60 includes functionality associated with performing error detection and correction for single bit errors and adjacent double bit errors associated with a data structure stored in the system memory 66. The cache coherency controller 62 also includes functionality associated with check bit generation to provide check bits employed during error detection and correction. It is also to be appreciated that the cache coherency controller 62 can include other functionality associated with controlling access to a crossbar device (not shown) over a crossbar bus 76.

The system memory 66 is comprised of a plurality of DRAM devices 68, labeled memory device #1 through #K, where #K is an integer greater than one. For illustrative purposes, the DRAM devices 68 of FIG. 3 will be discussed as being 4-bit column width devices. However, other column width devices (e.g., 8, 16, 32, 64, etc.) can be employed in accordance with the present invention. The system memory 66 is coupled to a data bus 80 and an address bus 82. The size of the data bus 80 and data structure read and written to the system memory during a DRAM cycle is equal to the number of memory devices 68 multiplied by the bit column width of the memory devices 68. In the present example, the system memory 66 is comprised of 72 DRAM devices with 4 bit-width columns. Therefore, the size of the data bus 80 and data structure stored and read in a single memory cycle is 288 bits.

The cache coherency controller 62 includes an error detection and correction (EDC) component 72 that performs error correction and detection on 144 bits including 12 check bits (e.g., 132 data bits, 12 check bits), which is a one of two portions of the 288 bit data structure stored and read in a single memory cycle. The EDC component 72 is operative to detect and correct both single bit errors and adjacent double bit errors. The functionality of the EDC component 72 can be comprised of hardware, software or a combination of hardware and software. The cache coherency controller 62 and the EDC component 72 can be formed from an application specific integrated circuit or very large scale integrated circuit (VLSI). Although the EDC component 72 is illustrated as residing in a cache coherency controller 62, it is to be appreciated that the EDC component 72 can reside in any memory controller or in a stand-alone component.

The cache coherency controller 62 is coupled to a crossbar device (not shown) via the crossbar bus 76 and a mid-bus 78. The crossbar device can be coupled to a plurality of microprocessor devices, input/output devices and/or memory devices (e.g., one or more cache memory devices), and allows for communications and routing between the various devices of the system 60. The mid-bus 78 connects the cache coherency controller 62 to the buffer/multiplexer device 64. The buffer/multiplexer device 64 is coupled to the system memory 66 via the data bus 80.

During a read operation, a data structure associated with an address is read from the plurality of DRAM devices 68 and provided to the buffer/multiplexer 64 via the data bus 80. The buffer/multiplexer 64 separates or partitions the 288 bit data structure into a first adjacent bit pair domain of 144 bits and a second adjacent bit pair domain of 144 bits. The first adjacent bit pair domain includes adjacent bit pairs from the first and second columns of the DRAM devices 68 associated with a given row address, and the second adjacent bit pair domain includes adjacent bit pairs from the third and fourth columns of the DRAM devices 68 associated with the given row address.

The data bits associated with the first adjacent bit pair domain are further partitioned into a first 72-bit portion and a second 72 bit portion. The first 72-bit portion and the second 72-bit portion associated with the first adjacent bit pair domain are transmitted over the mid-bus 78 sequentially to a reorder component 70. The reorder component 70 then reorders the first and second 72-bit portion into the original 144 bits associated with the first adjacent bit pair domain. The 144 bits associated with the first adjacent bit pair domain are then provided to the EDC component 72. The buffer/multiplexer 64 partitions the 144 bits associated with the second adjacent bit pair domain into a first 72-bit portion and a second 72-bit portion, which are sequentially transmitted to the reorder component 70, as the EDC component 72 is processing the 144 bits associated with the first adjacent bit pair domain. This process is repeated for subsequently read adjacent bit pair domains, such that a processing pipeline can be established. In one aspect of the invention, the data bus 80 operates at 125 MHZ and the mid-bus 78 operates at 500 MHZ.

The EDC component 72 separates the 132 data bits and the 12 check bits from the 144 bits associated with the respective adjacent bit pair domain. A syndrome is computed using the 132 data bits to produce a 144 bit error mask. The error mask is exclusive-OR'ed with the original 144 bit of data and check bits. The single bit errors and adjacent double bit errors are corrected. The 12 check bits are discarded and the remaining 132 bits are provided to a data organizer 74. The data organizer 74 reorganizes the 132 bits into 128 bit data blocks to be transmitted to the crossbar device to a requestor (e.g., a processor, I/O device).

During a write operation, a data block to be written to system memory 66 is received by the data organizer 74. The data organizer 74 assigns or separates adjacent data bit pairs to separate adjacent bit pair domains based on the column widths of the DRAM devices 68. The data bits are then provided to the reorder component 70 and a check bit generator 75. The check bit generator generates 12 check bits or correction bits associated with each adjacent bit pair domain. The check bits are then provided to the reorder component 70 to populated the adjacent bit pair domain with its associated check bits. Once all of the adjacent bit pair domains have been populated with data bits and check bits, the adjacent bit pair domains are transmitted over the mid-bus 78 to the buffer/multiplexer 64. The buffer/multiplexer 64 combines the data associated with the adjacent bit pair domains to form a data structure, which is then stored in the system memory 66 based on a selected address of the address bus 82.

Figure 4:
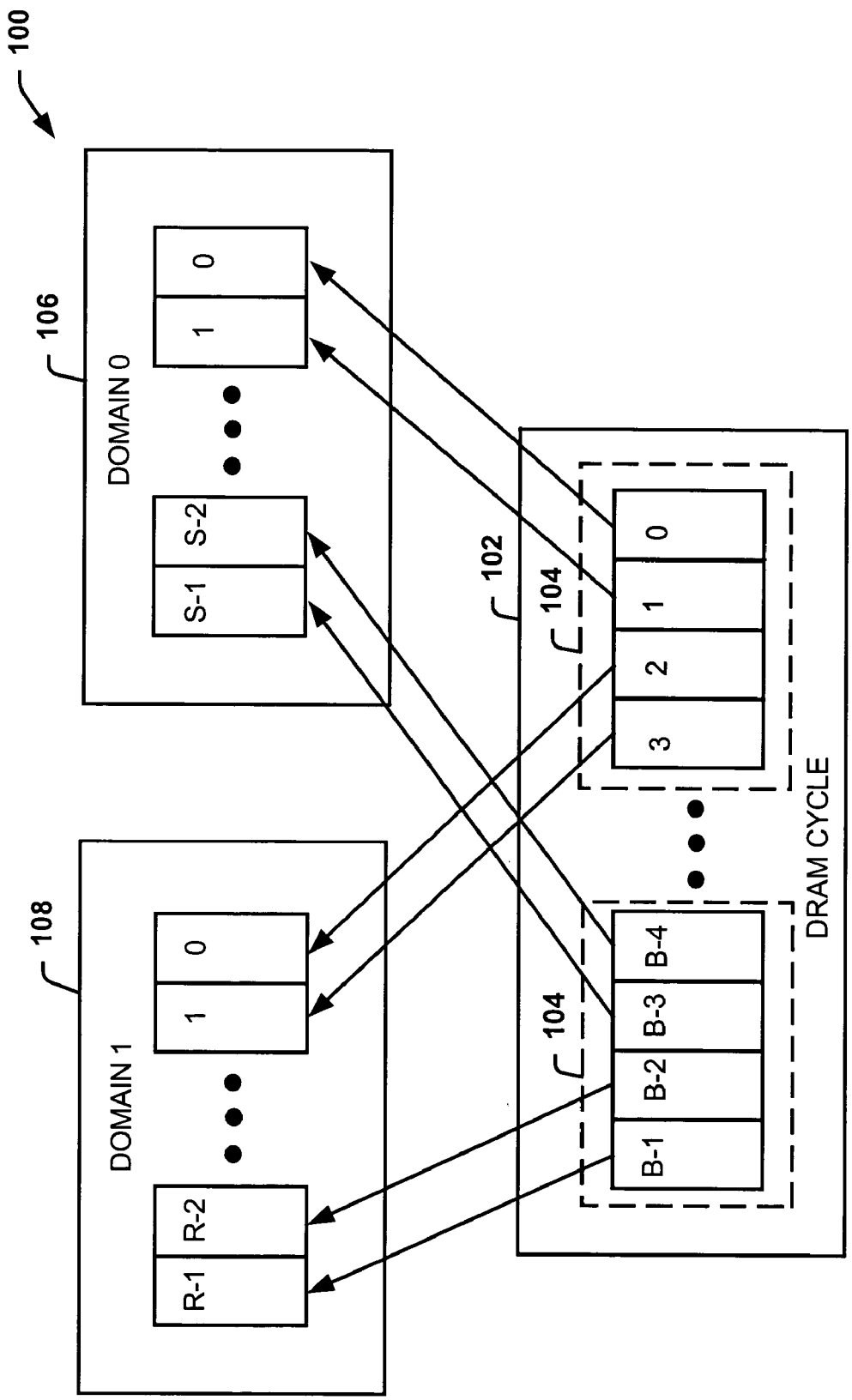
FIG. 4 illustrates a block diagram of an alternate adjacent bit pair domain configuration in accordance with an embodiment of the present invention.

FIG. 4 illustrates an alternate adjacent bit pair domain configuration 100 in accordance with an aspect of the present invention. The adjacent bit pair domain configuration 100 provides chipkill functionality for the system memory 66 of FIG. 3 that employs an ECC technique that can correct single bit errors and adjacent double bit errors for 144-bits of data with a memory data bus that is 288 bits wide. The configuration illustrates a data structure 102 associated with a DRAM cycle (e.g., read cycle, write cycle) having B data bits, where B is an integer multiple of 4 that is greater than or equal to 8. The data structure 102 includes a plurality of 4-bit wide nibbles 104 each being associated with a respective DRAM device.

A first adjacent bit pair of each of the 4-bit wide nibbles 104 are assigned to a first adjacent bit pair domain 106 (Domain 0) and the second adjacent bit pair of each of the 4-bit wide nibbles are assigned to a second adjacent bit pair domain 108 (Domain 1). The first adjacent bit pair domain 106 includes bits 0 through S−1, while the second adjacent bit pair domain 108 includes bits 0 through R−1, where R=S=B/2. The bits associated with the first adjacent bit pair domain 106 can be processed by an EDC component sequentially or in parallel with the bits associated with the second adjacent bit pair domain 108, such that chipkill for the memory system 66 is achieved.

Figure 5:
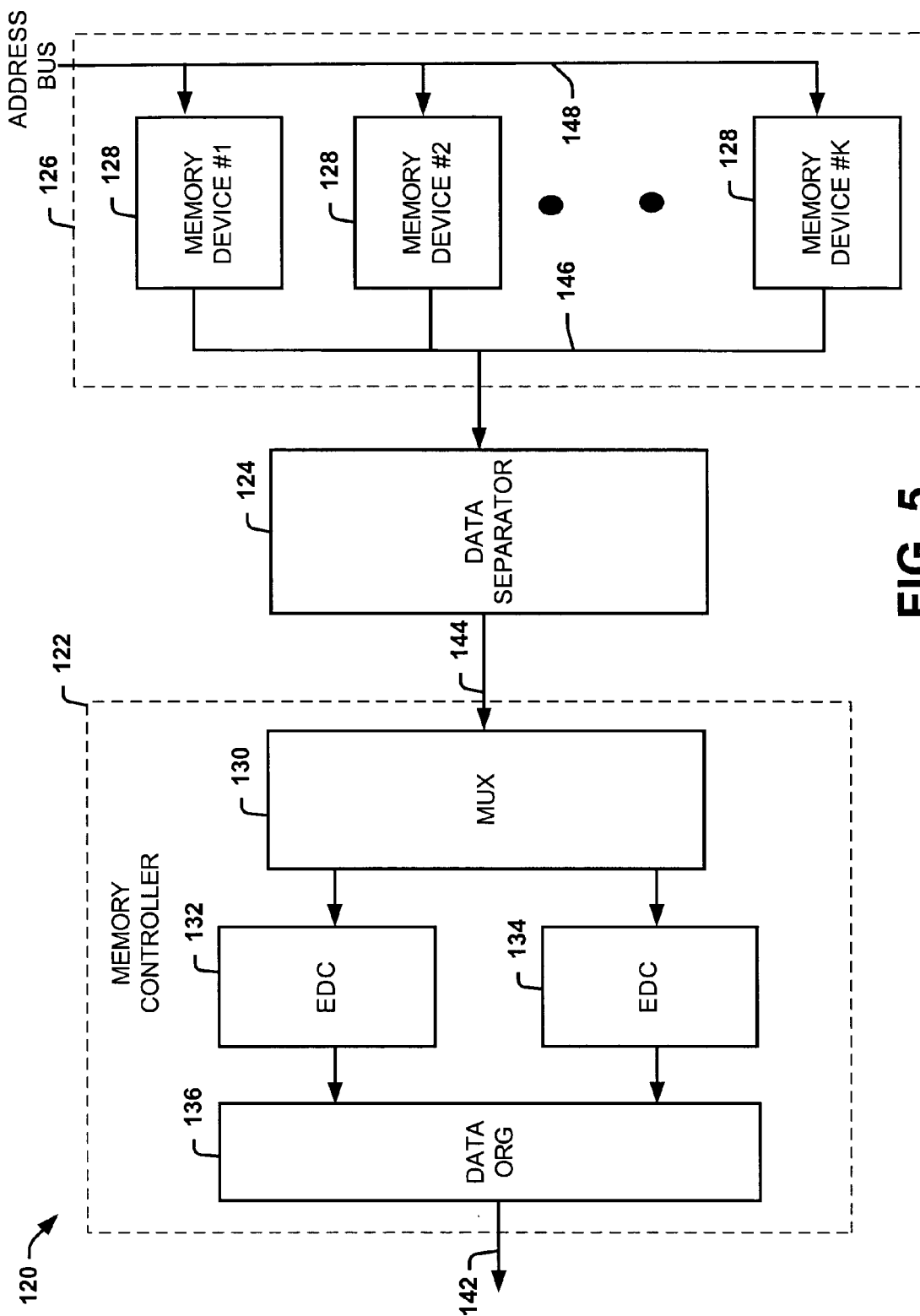
FIG. 5 illustrates a block diagram of a memory system with parallel error detection and correction in accordance with an embodiment of the present invention.

FIG. 5 illustrates a memory system 120 with parallel error detection and correction in accordance with an aspect of the present invention. The system 120 includes a memory controller 122, a data separator/combiner 124 and a system memory 126. The memory controller 122 includes a first EDC component 132 for performing error detection and correction on bits associated with a first adjacent bit pair domain, and a second EDC component 134 for performing error detection and correction on bits associated with a second adjacent bit pair domain. This provides for faster processing of data associated with read operations of data structures from system memory than systems employing a single EDC component. It is to be appreciated that the memory controller 122 can also include multiple check bit generators (not shown) to provide for faster storage of data structures in the system memory 126. Additional EDC components can be employed for additional adjacent bit pair domains.

The system memory 126 is comprised of a plurality of memory devices 128, labeled memory device #1 through #K, where #K is an integer greater than one. The system memory 126 is coupled to a data bus 146 and an address bus 148. The size of the data bus 146 and data structure is equal to the number of memory devices 128 multiplied by the bit column width of the memory devices 128. For example, the bit column width can be 4 with K being 72 to provide a 288-bit data structure. The data separator device 124 is coupled to the system memory 126 via the data bus 146. The memory controller 122 is coupled to a crossbar device (not shown) over a crossbar bus 142 and a mid-bus 144. The crossbar device can be coupled to a plurality of microprocessor devices, input/output devices and/or memory devices (e.g., one or more cache memory devices). The mid-bus 144 connects the memory controller 122 to the data separator device 124.

During a read operation, a data structure associated with an address selected via the address bus 148 is read from the plurality of memory devices 128 and provided to the data separator 124 via the data bus 146. The data separator 124 separates or partitions the data structure into a first adjacent bit pair domain and a second adjacent bit pair domain. The first adjacent bit pair domain includes a first set of adjacent bit pairs from each of the plurality of memory devices associated with a given row address, and the second adjacent bit pair domain includes a second set of adjacent bit pairs from each of the plurality of memory devices 128 associated with the same given row address, such that neither the first adjacent bit pair domain nor the second adjacent bit pair domain contain more than one adjacent bit pair from any single memory device.

The data bits associated with the first adjacent bit pair domain are transmitted from the data separator 124 to a multiplexer 130 over the mid-bus 144. The data bits associated with the first adjacent bit pair domain can be transmitted in full or partitioned and transmitted in portions and recombined by the multiplexer 130. The multiplexer 130 transmits the first adjacent bit pair domain to the first EDC component 132, while the data separator 124 is transmitting the data bits associated with the second adjacent bit pair domain. The data bits associated with the second adjacent bit pair domain can be transmitted in full or partitioned and transmitted in portions and recombined by the multiplexer 130. The multiplexer 130 transmits the second adjacent bit pair domain data bits to the second EDC component 134, while the adjacent bit pair data separator 124 is transmitting data bits associated with the first adjacent bit pair domain for a subsequently read data structure. In this manner, a processing pipeline is established, until all of the desired data structures are read from the system memory 126. After processing by the EDC components 132 and 134, the corrected data is transmitted to a data organizer 136 for aggregation and reorganization to be transmitted to the crossbar device and routed to a requestor.

Figure 6:
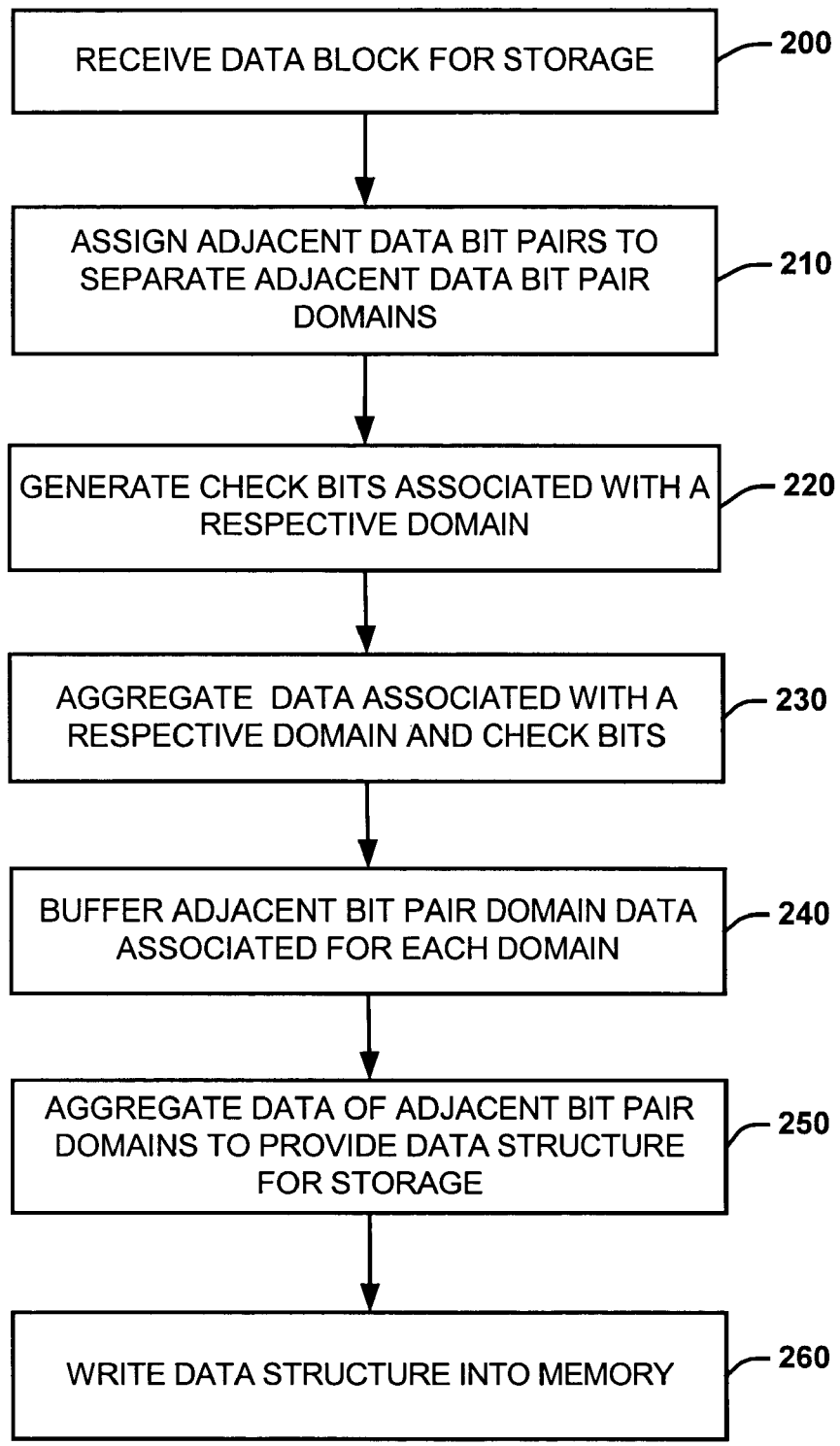
FIG. 6 is a flow diagram illustrating a methodology for storing a data block in accordance with an embodiment of the present invention.
Figure 7:
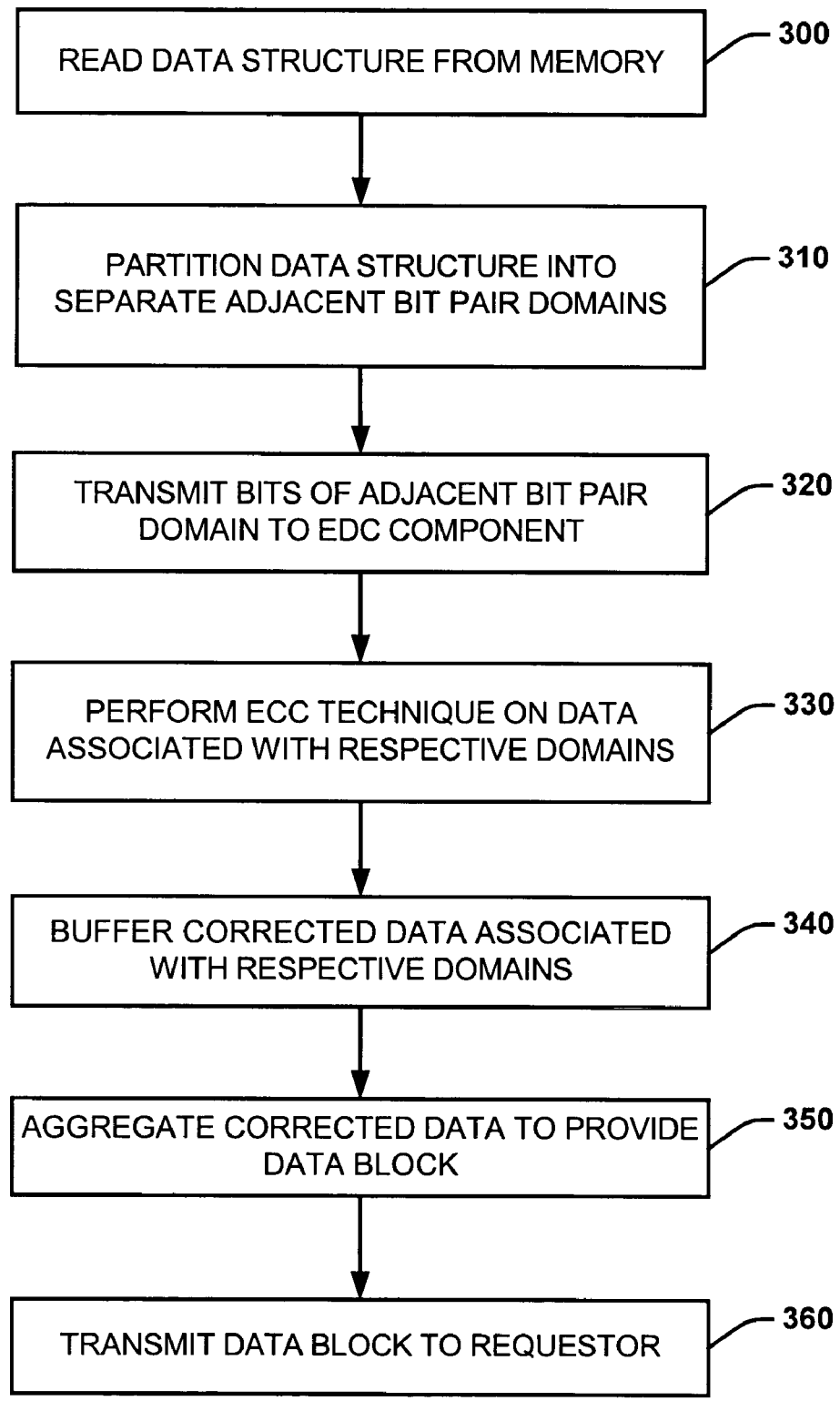
FIG. 7 is a flow diagram illustrating a methodology for reading a data structure in accordance with an embodiment of the present invention.

In view of the foregoing structural and functional features described above, methodologies in accordance with an aspect of the present invention will be better appreciated with reference to FIGS. 6–7. While, for purposes of simplicity of explanation, the methodologies of FIGS. 6–7 are shown and described as being implemented serially, it is to be understood and appreciated that the present invention is not limited to the illustrated order, as some aspects could, in accordance with the present invention, occur in different orders and/or concurrently with other aspects from that shown and described. Moreover, not all illustrated features may be required to implement a methodology in accordance with an aspect of the present invention. It is to be further understood that the following methodologies can be implemented in hardware, software (e.g., computer executable instructions), or any combination thereof.

FIG. 6 illustrates a methodology for storing data in accordance with an aspect of the present invention. The methodology begins at 200 where a data block is received for storage in system memory. At 210, adjacent bit pairs are assigned to separate adjacent bit pair domains, such that a given adjacent bit pair domain contains a single adjacent bit pair associated with each memory device for a given address. The number of adjacent bit pair domains is based on the column widths of the memory devices forming the system memory. That is the number of domains is equal to the number of adjacent bit pairs in a row of memory. At 220, check bits are generated associated with a respective adjacent bit pair domain. The check bits are then aggregated (e.g., filled in at an assigned location) with the data bits associated with a respective adjacent bit pair domain at 230. At 240, data associated with the adjacent bit pair domains are buffered in preparation for storage.

It is to be appreciated that the adjacent bit pair domains can be buffered in a sequential manner, such that one adjacent bit pair domain is being stored, while check bits are generated for a subsequent domain in a pipeline processing manner to facilitate storage speed of the received data block. It is also to be appreciated that the check bit generation can occur in parallel for separate adjacent bit pair domains to facilitate storage speed of the received data block. The methodology then proceeds to 250.

At 250, the data associated with the adjacent bit pair domains are aggregated to provide a data structure for storage. At 260, the data structure is written into memory to corresponding columns of the plurality of memory devices, such that only one adjacent bit pair is stored in a memory device column for a given row address associated with a respective adjacent bit pair domain.

FIG. 7 illustrates a methodology for reading data in accordance with an aspect of the present invention. The methodology begins at 300 where a data structure is read from the system memory. At 310, the data structure is partitioned into separate adjacent bit pair domains, such that a single adjacent bit pair domain contains one adjacent bit pair from each memory device. The number of adjacent bit pair domains depends on the column widths of the memory devices forming the system memory. At 320, the bits associated with the respective adjacent bit pair domains are transmitted to one or more EDC components for error detection and correction processing in a sequential and/or parallel manner. A single EDC component can be employed for sequential processing, while multiple EDC components can be employed for parallel processing. The methodology then proceeds to 330.

At 330, an EDC technique is performed on the bits associated with a respective adjacent bit pair domain for each adjacent bit pair domain. The EDC technique determines the existence of errors in a adjacent bit pair domain by separating data bits from the check bits, performing an ECC routine on the data structure portion to generate a syndrome to produce a mask, and performing an exclusive-OR on the data structure portion and the mask to detect single bit errors and adjacent double bit errors. The EDC technique then corrects the single bit errors and adjacent double bit errors. The corrected data structure portions associated with respective adjacent bit pair domains are then buffered (e.g., in sequence, in parallel) at 340. At 350, the data associated with each of the adjacent bit pair domain is aggregated with the check bits discarded to provide a data block. At 360, the data block is transmitted to a requestor (e.g., a processor through a crossbar device).

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for detecting and correcting errors in a data structure, comprising:
   a data structure stored in a plurality of memory devices associated with a memory address;
   a data separator that partitions the data structure into adjacent bit pair domains, such that a single adjacent bit pair from each of the plurality of memory devices is assigned to an adjacent bit pair domain; and
   an error detection and correction (EDC) component that detects and corrects errors associated with a given adjacent bit pair domain.

2. The system of claim 1, the EDC component detects and corrects errors associated with the plurality of adjacent bit pair domains in a sequential manner.

3. The system of claim 1, further comprising at least one additional EDC component, such that errors associated with the plurality of adjacent bit pair domains are detected and corrected by a respective EDC component in a parallel manner.

4. The system of claim 1, the data separator being a buffer/multiplexer device coupled between the plurality of memory devices and the EDC component.

5. The system of claim 4, the buffer/multiplexer is coupled to the plurality of memory devices through a data bus and to the EDC component through a mid-bus, the buffer/multiplexer receives the data structure from the plurality of memory devices and transmits the adjacent bit pair domains in a sequential manner over the mid-bus to the EDC component.

6. The system of claim 1, the data structure comprising B bits and the plurality, of adjacent bit pair domains having B/2 bits, where B is an integer multiple of four that is greater than or equal to eight.

7. The system of claim 6, the data structure comprising 288 bits and each of the plurality of adjacent bit pair domains having 144 bits.

8. The system of claim 1, the data structure having $K*W$ bits, where K is the number of the plurality of memory devices forming the system memory, and W is the column widths of the plurality of memory devices.

9. The system of claim 1, further comprising a check bit generator that generates check bits that are aggregated with data bits to form an adjacent bit pair domain, the adjacent bit pair domains being combined to form the data structure.

10. A server comprising the system of claim 1.

11. The system of claim 1 enabling chipkill functionality for the plurality of memory devices.

12. A memory system comprising:
a plurality of memory devices operative to store a data structure over the plurality of memory devices corresponding to a given memory address;
a buffer/multiplexer device that transmits and receives the data structures over a first bus and transmits and receives adjacent bit pair domain data over a second bus;
the adjacent bit pair domain data comprising data bits and check bits assigned to a given adjacent bit pair domain, such that a single adjacent bit pair from each of the plurality of memory devices corresponding to the given memory address is assigned to a given adjacent bit pair domain for each of a plurality of adjacent bit pair domains; and
a controller operative to transmit and receive adjacent bit pair domain data over the second bus and operative to transmit and receive data blocks corresponding to the adjacent bit pair domain data over a third bus.

13. The system of claim 12, the controller being one of a memory controller and a cache coherency controller.

14. The system of claim 12, the controller further comprising an error detection and correction (EDC) component operative to detect and correct single bit errors and adjacent double bit errors associated with a respective adjacent bit pair domain.

15. The system of claim 14, the controller further comprising a check bit generator that generates check bits associated with respective adjacent bit pair domains, the check bits being employed by the EDC component to correct single bit errors and adjacent double bit errors.

16. An error correction system, comprising:
means for partitioning a data structure into a plurality of adjacent bit pair domains, each adjacent bit pair domain being populated with a single adjacent bit pair from each of a plurality of memory devices associated with a given memory address; and
means for detecting and correcting single bit errors and adjacent double bit errors associated with a respective adjacent bit pair domain.

17. The system of claim 16, further comprising means for transmitting the plurality of adjacent bit pair domains in a sequential manner to the means for detecting and correcting.

18. The system of claim 16, the means for detecting and correcting comprising a plurality of means for detecting and correcting single bit errors and adjacent double bit errors associated with different respective adjacent bit pair domains.

19. A method of reading data from a plurality of memory device defining a system memory, the method comprising:
reading a data structure from rows of the plurality of memory devices associated with a given memory address;
separating the data structure into a plurality of adjacent bit pair domains, each adjacent bit pair domains having a single adjacent bit pair from each of the plurality of memory devices associated with the given memory address; and
performing error detection and correction on the plurality of adjacent bit pair domains.

20. The method of claim 19, the performing error detection and correction on the plurality of adjacent bit pair domains comprising performing error detection and correction on the respective adjacent bit pair domains in one of a sequential and parallel manner.

21. The method of claim 19, the performing error detection and correction on the plurality of adjacent bit pair domains comprising performing error detection and correction to correct for single bit errors and adjacent double bit errors in respective adjacent bit pair domains.

22. The method of claim 19, further comprising discarding check bits associated with corrected respective adjacent bit pair domains, and combining the corrected respective adjacent bit pair domains to form a data block.

23. A method of storing data into a plurality of memory device defining a system memory, the method comprising:
receiving a data block for storage;
assigning adjacent data bit pairs to respective adjacent bit pair domains, each adjacent bit pair domain having a single adjacent bit pair associated with each of a plurality of memory devices for a given memory address;
generating check bits for each adjacent bit pair domain;
populating each respective adjacent bit pair domain with its associated check bits;
combining the adjacent bit pair domains to provide a data structure for storage; and
writing the data structure into the plurality of memory devices at the given memory address.

24. The method of claim 23, the generating and aggregation of check bits being performed in one of a sequential manner and a parallel manner.

* * * * *

UNITED STATES PATENT AND TRADEMARK OFFICE
CERTIFICATE OF CORRECTION

| | |
|---|---|
| PATENT NO. | : 7,065,697 B2 |
| APPLICATION NO. | : 10/632207 |
| DATED | : June 20, 2006 |
| INVENTOR(S) | : Theodore Carter Briggs et al. |

Page 1 of 1

It is certified that error appears in the above-identified patent and that said Letters Patent is hereby corrected as shown below:

In column 4, lines 42-46, after "unit 12." delete "Each adjacent bit pair domain includes a data portion and a correction bit portion. The number of bits in an adjacent bit pair domain corresponds to the number of bits correctable by the error corrector 13 in the error correction unit 12.".

In column 10, line 58, in Claim 6, after "plurality" delete ",".

Signed and Sealed this

Tenth Day of March, 2009

JOHN DOLL
*Acting Director of the United States Patent and Trademark Office*